United States Patent [19]

Tinaphong

[11] Patent Number: 5,198,903
[45] Date of Patent: Mar. 30, 1993

[54] TELEVISION FREQUENCY CONVERTER WITH AUTOMATIC GAIN CONTROL AND OUTPUT TERMINAL ISOLATION

[75] Inventor: Prapan Tinaphong, Parsippany, N.J.
[73] Assignee: Gemini Industries Inc., Clifton, N.J.
[21] Appl. No.: 625,674
[22] Filed: Oct. 12, 1990

Related U.S. Application Data

[63] Continuation-in-part of Ser. No. 508,937, Apr. 12, 1990, abandoned.
[51] Int. Cl.⁵ .......................... H04N 5/38; H04N 5/40
[52] U.S. Cl. .................................... 358/186; 455/307; 455/189.1
[58] Field of Search ............ 358/186, 188, 189, 195.1, 358/140-143, 83, 174; 455/132-134, 188, 189, 307, 310, 311, 317, 283

[56] References Cited

U.S. PATENT DOCUMENTS

| | | |
|---|---|---|
| 2,831,105 | 4/1958 | Parker . |
| 3,499,981 | 4/1968 | Neal et al. ............................ 358/174 |
| 3,904,968 | 9/1975 | Brinegar ............................... 455/307 |
| 4,145,720 | 3/1979 | Weintraub et al. . |
| 4,535,361 | 9/1985 | Corbel .................................. 358/186 |
| 4,642,691 | 2/1987 | Sakarya ................................ 455/307 |
| 4,872,145 | 10/1989 | Culbert et al. ...................... 455/283 |
| 4,912,775 | 3/1990 | Matsuura ........................... 455/189.1 |
| 4,916,532 | 4/1990 | Streck et al. ......................... 353/83 |

*Primary Examiner*—James J. Groody
*Assistant Examiner*—Glenton B. Burgess
*Attorney, Agent, or Firm*—Lerner, David, Littenberg, Krumholz & Mentlik

[57] ABSTRACT

A system for wireless connection of a television signal source such as a video cassette player to a standard television receiver within a home. A local television signal is modulated on a nonstandard carrier frequency different form the standard carrier frequencies utilized for conventional broadcast television. The nonstandard broadcast signal is unintelligible to a standard television receiver. Because a nonstandard broadcast signal is employed, the television signal cannot be received by standard television receivers in neighboring homes. A converter unit at the remote location adjacent the television receiver receives the nonstandard signal, amplifies the received signal, mixes the received signal with a local oscillator signal to convert the nonstandard signal to an output signal on a standard television channel carrier frequency at an output terminal connected to the antenna input of a television set. An automatic gain control device controls the amplification of the received signal by monitoring the amplitude of the output signal. The automatic gain control device is isolated from externally applied signals appearing at the output terminal.

7 Claims, 7 Drawing Sheets

| FIG. 4A | FIG. 4B |
|---------|---------|

| FIG. 5A | FIG. 5B |
|---|---|

| FIG. 6A | FIG. 6B |

FIG. 6B

TELEVISION FREQUENCY CONVERTER WITH AUTOMATIC GAIN CONTROL AND OUTPUT TERMINAL ISOLATION

CROSS-REFERENCE TO RELATED APPLICATIONS

The present application is a continuation-in-part of U.S. patent application Ser. No. 07/508,937, filed Apr. 12, 1990 abandoned.

FIELD OF THE INVENTION

The present invention relates to the art of television, and more particularly relates to apparatus and methods for interconnecting television signal sources and television receivers within a building.

BACKGROUND OF THE INVENTION

Many homes are equipped with several television receivers located in different rooms. Also, many homes are equipped with plural sources of television signals, such as an ordinary antenna for capturing standard television broadcasts, a video cassette playback device commonly referred to as a "VCR", a video disk player, and a satellite receiver for receiving programs broadcast by earth satellites. All this contributes greatly to the convenience and enjoyment of television viewing, but also creates a substantial problem of interconnecting the television signal sources and television receivers within the home. It has been the practice heretofore to connect the signal sources with television receivers located in other rooms via cables extending between the rooms. Installation of these cables requires considerable effort and expense, and is often impractical. As more and more television receivers and television signal sources have been utilized within the home, this problem has become progressively more acute.

Efforts have been made heretofore to solve this problem by rebroadcasting signals from the various sources within a home. Thus, one device previously sold within the United States under the trademark TV GENIE incorporated a local transmitter arranged to accept television signals from a source within the home, modulate these television signals on a carrier at a standard television carrier frequency and then radiate this modulated carrier in free space. In essence, the local transmitter provided a locally broadcast standard television signal. This signal could be received by television receivers within the home utilizing an antenna at each such receiver. This approach entirely eliminated the need for wiring between the source and the remote television receiver. However, the locally broadcast signal could be received by any standard television receiver. Thus anyone outside the home but within range of the signal, such as in a neighboring home, could receive the signal. When the device was utilized with material not deemed suitable for broadcast over the public airwaves, others in the community such as children in neighboring homes could be exposed to such unacceptable programming.

Other local broadcast systems have been devised using non-standard carrier frequencies. For example, United States Federal Communications Commission Report No. 1544 of Oct. 21, 1985, and rulemaking petition RM 5193 referred to therein, describes a system wherein a television signal is locally broadcast at 902-928 MHz. Such a signal cannot be received by an ordinary television set. To permit reception, the television set is provided with a special adapter which receives the 902-928 MHz signal and converts it to a standard television carrier frequency. U.S. Pat. No. 2,508,353 discloses a frequency shifting radio relay system for uses other than local broadcasting of television signals.

However, none of these systems are truly satisfactory. In particular, frequency-shifting systems which work properly in a laboratory setting are susceptible to severe distortion of the transmitted television signal when used in actual operation within the home. Thus, prior to the present invention, there have been needs for a system which would alleviate those difficulties.

SUMMARY OF THE INVENTION

One aspect of the present invention includes a converter for receiving a nonstandard broadcast signal on a nonstandard carrier frequency and recovering a television signal in a form intelligible to a standard television receiver. The converter according to this aspect of the present invention most preferably includes RF amplification means for amplifying the received nonstandard broadcast signal to provide an amplified RF signal; local oscillator means for providing a local oscillator signal at a local oscillator frequency such that the difference between the local oscillator frequency and the nonstandard carrier frequency corresponds to a standard television carrier frequency and means for mixing the oscillator signal with the amplified RF signal to thereby provide a mixed signal incorporating the television signal modulated on a standard television carrier frequency.

The present invention incorporates the realization that in such a system, the nonstandard broadcast signal will vary greatly in strength. Ordinarily, the nonstandard broadcast signal comes from a transmitter attached to a source of video information such as a VCR or the like. As further discussed below, changes in the physical location of the transmitter and converter within the home may result in wide variations in signal attenuation along the signal path from the transmitter to the converter. The converter according to this aspect of the present invention therefore preferably incorporates automatic gain control means for monitoring the amplitude of the mixed signal and adjusting the gain of the RF amplification means in response to said amplitude so as to maintain said amplitude at a substantially predetermined value. This substantially eliminates the difficulties encountered due to differences in the attenuation along the signal path in a system of this type.

The converter desirably further includes an output terminal for connection to a television receiver, and output amplifier means for amplifying the mixed signal to provide an output signal and providing this output signal to the output terminal. The automatic gain control means may include output monitoring means for monitoring the amplitude of the output signal and thus monitoring the amplitude of the mixed signal after amplification in the output amplifier means. The automatic gain control means may also include means for adjusting the gain of the output amplifier means, as well as the gain of the RF amplification means.

A further, significant aspect of the present invention incorporates the realization that the output terminal is susceptible to externally applied signals, such as local oscillator signals from within a television set, reflected back to the antenna terminals of the television set and, hence, back to the output terminal of the converter. The output terminal may also be exposed to stray electromagnetic interference signals and other unwanted signals. The converter according to this aspect of the present invention incorporates the realization that these externally-applied signals may propagate through an automatic gain control apparatus and, hence, may create unwanted variation in operation of the automatic gain control means. The converter according to this aspect of the present invention therefore most preferably includes isolation means for substantially isolating the automatic gain control device from externally-applied signals appearing at the output terminal. The isolation means may incorporate first and second inductors connected in series between the output terminal and the output monitoring means, the output amplifier means being connected to the output terminal via the first inductor and to the output monitoring means via the second inductor. The two inductors may be formed as a unitary splitter coil having a center tap and a pair of end taps. The output amplifier may be connected to the center tap, whereas, the output terminal and the output monitoring means may be connected to opposite ones of the end taps. In this arrangement, any signal introduced at the output terminal would have to propagate through both inductors and, hence, through both halves of the splitter coil, before reaching the output monitoring means of the automatic gain control device. Most preferably, the splitter coil used in the device according to this aspect of the present invention is an inexpensive device of the type employed for splitting television signals for transmission to two separate receivers. According to this aspect of the present invention, it has been found that such a splitter coil can be used effectively to isolate the output monitoring means from the output terminal without substantially interfering with free transmission of the output signal from the output amplifier to the output terminal. Effective isolation of the output monitoring means from external signals appearing at the output terminal markedly enhances the stability of the system and substantially diminishes the distortion caused by interfering signals appearing at the output terminal.

A still further aspect of the present provides a system incorporating a converter as described above in conjunction with a transmitter for generating a carrier signal at a nonstandard carrier frequency and modulating the carrier with the television signal so as to provide the nonstandard broadcast signal.

Still further aspects of the present invention provide methods of receiving and converting a nonstandard television broadcast signal. Most desirably, methods according to this aspect of the present invention include the steps of amplifying the received nonstandard broadcast signal to provide an amplified RF signal, providing a local oscillator signal at a local oscillator frequency and mixing the local oscillator signal with the amplified RF signal to thereby provide a mixed signal. The method according to this aspect of the present invention desirably further includes the steps of amplifying the mixed signal to provide an output signal and delivering the output signal through an output terminal to the television set. Most desirably, the method includes the step of monitoring the amplitude of the output signal and adjusting the gain applied in the step of amplifying the received nonstandard broadcast signal so as to control the amplitude of the output signal. The method most desirably further includes the step of substantially attenuating external signal applied to the output terminal so that these external signals do not substantially affect the step of monitoring the output signal. Methods according to this aspect of the present invention may further include the step of transmitting the television signal on a nonstandard carrier frequency.

These and other objects, features and advantages of the present invention will be more readily apparent from the detailed description of the preferred embodiments set forth below, taken in conjunction with the accompanying drawings.

These and other objects, features and advantages of the present invention will be more readably apparent from the detailed description of the preferred embodiment set forth below taken in conjunction with the accompanying drawings.

DETAILED DESCRIPTION OF THE PREFERRED EMBODIMENTS

Figure 1:
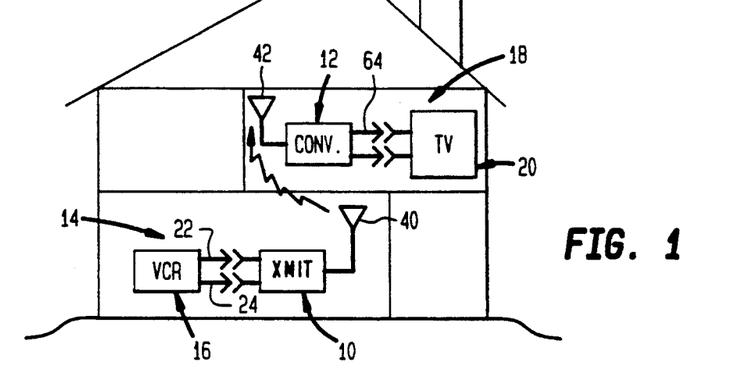
FIG. 1 is a diagrammatic view of a system in accordance with one embodiment of the present invention installed within a home.

Apparatus in accordance with one embodiment of the present invention includes a transmitter unit 10 (FIG. 1) and a converter unit 12. Transmitter 10 is disposed at a source location, such as within one room 14 of a home, and is connected to the signal source by a conventional wired connection. The converter unit 12 is disposed at a location within the home remote from the source location, such as in room 18 other than room 14. The converter unit is physically connected to a standard television receiver 20. In operation, transmitter unit 10 receives a television signal in the form of baseband audio and video signals from signal source 16. Transmitter unit 10 converts this television signal to a nonstandard broadcast signal and radiates this nonstandard broadcast signal in free space. Converter unit 12 receives the nonstandard broadcast signal, recovers the television signal in a form intelligible to receiver 20 and provides the recovered signal to the receiver.

Figure 2:
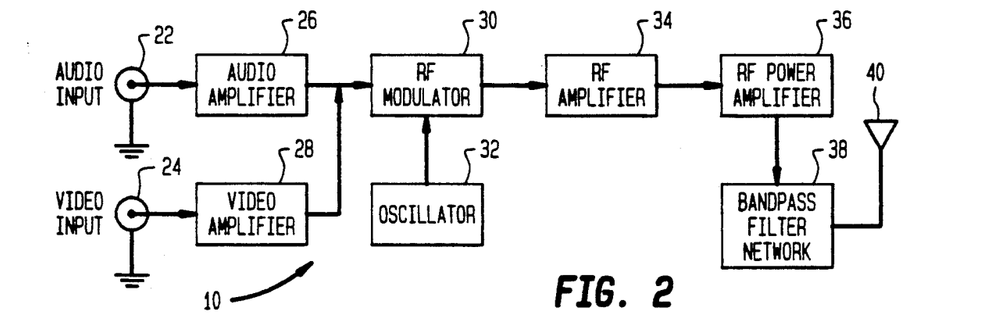
FIG. 2 is a block diagram depicting certain components utilized in the system of FIG. 1.

Transmitter unit 10 includes an audio input 22 and a video input 24 for receipt of the audio and video components respectively of a baseband television signal. The transmitter unit further includes an audio amplifier 26 and a video amplifier 28 connected to audio and video inputs 22 and 24 respectively. The outputs of audio and video amplifiers 26 and 28 are connected to the signal input of a radio frequency modulator 30. Modulator 30 is also connected to a carrier frequency oscillator 32. Oscillator 32 is arranged to provide a carrier signal at a predetermined nonstandard carrier frequency. The frequency is substantially higher than the frequencies normally utilized for standard television signals, i.e., the standard signals in the VHF and UHF television channels. As used in this disclosure, the term "standard television carrier frequency" refers to the carrier frequencies associated by governmental regulations in the United States with VHF television channels 2 through 13 and with UHF channels 14 through 83. These channels lie in the range of 55.25 to 885.25 MHZ. Conversely, the term "nonstandard carrier frequency" means a carrier frequency other than a standard television carrier frequency. Also as used in this disclosure the term "standard television receiver" refers to a television receiver adapted to receive broadcast television signals on VHF channels 2 through 13 and UHF channels 14 through 83 which signals conform to the television standards established by United States Federal Communications Commission regulations. The term "standard television receiver" thus describes the common television receiver sold at retail in the United States for consumer use.

The carrier frequency provided by oscillator 32 desirably is a frequency in a so called "ISM" frequency band i.e., a frequency band allotted by governmental authorities for industrial, scientific, and medical purposes. The regulations governing radio frequency emissions in such bands are substantially more liberal than the regulations governing emissions in bands allocated for broadcast communications, and permit radiation of signals with substantial power levels without individual licensing of the transmitter. Most preferably, the nonstandard carrier frequency supplied by oscillator 32 is a frequency within the 902-928 MHz (megahertz) band allocated as an ISM band in the United States.

RF modulator 30 is arranged to frequency modulate the carrier from oscillator 32 with the audio information in the signal from amplifier 26 and to amplitude modulate the carrier with the video information in the signal from amplifier 28, so as to provide a radio frequency signal bearing the information in the television signal. The RF signal provided by modulator 30 thus occupies a predetermined band, typically about 12 MHz bandwidth, centered on the carrier frequency as set by oscillator 32.

A radio frequency ("RF") amplifier 34 is connected to the output of modulator 30, and a further RF amplifier 36 is connected to amplifier 34. These amplifiers are arranged to amplify the signal from modulator 30 stagewise. A bandpass filter network 38 is connected to the output of amplifier 36. Filter network 38 is arranged to limit the signal from amplifier 36 to the intended frequency band, i.e., the band of frequencies around the nonstandard carrier frequency which would be produced by application of the audio and visual signals to the carrier. The bandpass filter thus serves to exclude from the signal spurious components which may be introduced by the other elements of the apparatus. The output of bandpass filter network is connected to an antenna 40.

Figure 3:
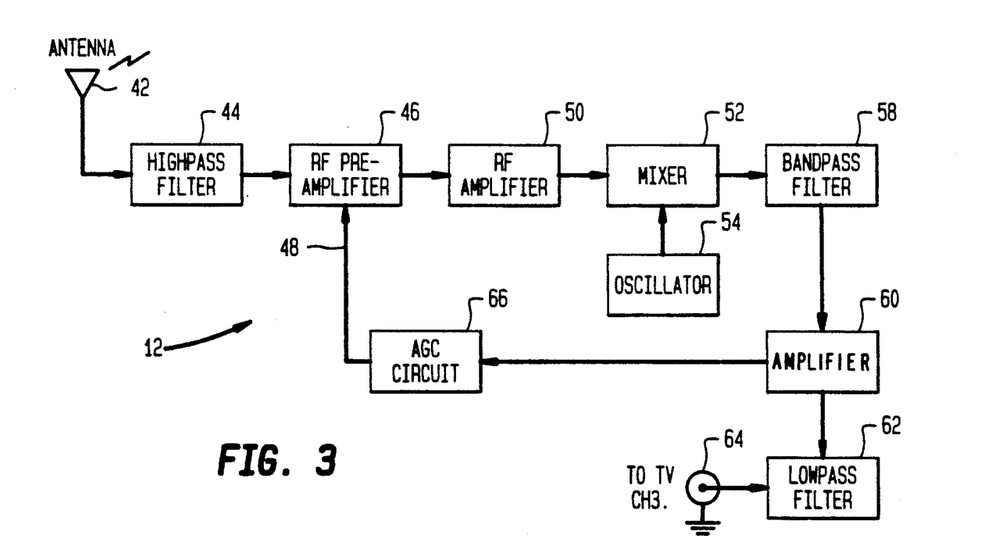
FIG. 3 is a block diagram depicting additional components utilized in the system of FIG. 1.

Converter unit 12 incorporates a receiving antenna 42 connected to an input of a high pass filter 44. High pass filter 44 is arranged to exclude signal components at frequencies considerably below the band of filter network 38, i.e. signals considerably below the range of frequencies intentionally included present in the signal from the transmitter 10. Typically, high pass filter network 44 is arranged to suppress signal components at frequencies below about 902 MHz. The output of high pass filter 44 is connected to the input of variable gain RF preamplifier 46. Amplifier 46 is arranged to amplify the signal supplied to it and to apply a gain dependent upon the magnitude of a signal suppled via a gain control input 48. The signal output of amplifier 46 is connected to the input of a further RF amplifier 50. The output of amplifier 50 in turn is connected to one input of a mixer 52. Another input of mixer 52 is connected to a local oscillator 54.

Local oscillator 54 is arranged to provide a signal at a predetermined local oscillator frequency. This local oscillator frequency is selected so that the difference the local oscillator frequency and the nonstandard carrier frequency supplied by oscillator 32 of transmitter unit 10 corresponds to a standard television carrier frequency utilized for transmission of television signals on a standard channel, preferably TV channel 3. For example, where the carrier frequency applied by oscillator 32 is about 910 MHz, the local oscillator frequency applied by oscillator 54 may be about 970 MHz so that the difference between the two is about 60 MHz, the carrier frequency employed for VHF channel 3. Combination of the signal from local oscillator 54 with the amplified RF signal from amplifier 50 in mixer 52 yields a mixed signal corresponding to the difference in frequencies between the two signals. As the signal from amplifier 50 incorporates the carrier frequency from oscillator 32 modulated with the television signal information, the mixed signal appearing at the output of mixer 52 will be a signal having the same television information modulated on a carrier frequency equal to the difference between the carrier frequency of oscillator 32 and the local oscillator frequency of oscillator 54. Thus, the mixed signal will incorporate the television information modulated on a carrier frequency corresponding to the difference in frequencies between the local oscillator frequency and the nonstandard carrier frequency supplied by oscillator 32 of the transmitter. The mixed signal from mixer 52 therefore will incorporate the television signal information modulated on a carrier frequency corresponding to this difference frequency and hence corresponding to a standard television carrier frequency. Thus, for a standard carrier frequency corresponding to TV channel 3, filter 58 is arranged to pass frequencies in a passband about 12 MHz wide and centered at about 60 MHz.

The output of mixer 52 is connected to the input of a bandpass filter 58. Filter 58 is arranged to limit the signal from mixer 52 to components in the frequency band associated with normal television transmission on the standard carrier frequency. Thus, for a standard carrier frequency corresponding to TV channel 3, filter 58 is arranged to pass frequencies in a passband about 12 MHz wide and centered at about 60 MHz. The output of bandpass filter 58 is connected to the input of a mixed signal amplifier 60. The output of amplifier 60 in turn is connected to the input of a low pass filter 62 arranged to exclude frequencies substantially above the band associated with the standard carrier frequency. This low pass filter 62 acts to filter out undesired signals, such as interference, harmonics, and feedback signals from the RF preamplifier stage 46. This ensures that the output from converter 12 will be a "clean" output signal which is suitable for a standard TV receiver. The output of filter 62 is connected to a signal output terminal 64, which may be a standard coaxial connector or other connector adapted for connection to the antenna terminals of a standard television receiver.

The output of mixed signal amplifier 60 is also connected to an automatic gain control or "AGC" circuit 66. AGC circuit 66 is arranged to detect the amplitude of the mixed signal after amplification by amplifier 60 and filtering by bandpass filter 58 and to provide a control signal having magnitude related to the amplitude of the mixed signal. The control signal output of AGC circuit 66 is connected to the control input 48 of RF preamplifier 46. Thus, AGC circuit 66 operates to adjust the gain of RF preamplifier 46. As will be appreciated, the amplitude of the mixed signal appearing at amplifier 60 will be directly related to the amplitude of the RF signal as amplified by preamplifier 46. The response characteristics of AGC circuit 66 and preamplifier 46 are selected so as to provide a stable feedback control action in which the gain applied by amplifier 46, and hence the amplitude of the amplified RF signal will decrease responsive to increase in the amplitude of the mixed signal appearing at amplifier 60. In effect, AGC circuit 66 adjusts the gain of amplifier 46 so as to maintain the amplitude of the mixed signal within a relatively narrow range around a predetermined value even if the signal received at antenna 42 varies greatly in amplitude.

In one method according to the invention, VCR 16 supplies the audio and video baseband components to the amplifiers 26 and 28 of transmitter 10 via inputs 22 and 24. These components are modulated on the nonstandard carrier frequency from oscillator 32, and amplified and filtered so as to provide nonstandard broadcast signal which is radiated at antenna 40. The radiated nonstandard broadcast signal is received at antenna 42, amplified and mixed with the local oscillator signal to provide a mixed signal, which is in turn amplified and filtered to provide an output signal at terminal 64. This output signal incorporates the audio and video components frequency modulated on a standard carrier television frequency and hence is intelligible to a standard television receiver. The output signal is supplied to the television receiver 20 at the remote location 18 through the antenna inputs of the television receiver. The television receiver processes this signal in exactly the same way as it would process a normal broadcast signal. The AGC circuit 66 and adjustable gain preamplifier 46 maintain the amplitude of the output signal within the proper range for reception by the television receiver even if the signal attenuation between antennas 40 and 42 varies over a wide range. The degree of attenuation over the signal path between antennas 40 and 42 will depend upon the distance between the antennas and the nature of any intervening structures such as walls or floors. These factors are subject to considerable variation depending upon the particular installation.

Figure 4:
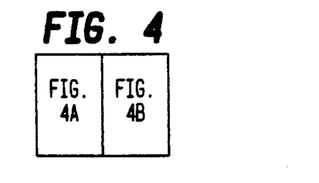
FIGS. 4, 4A and 4B are schematic diagrams depicting the components illustrated in FIG. 2.
Figure 4A:
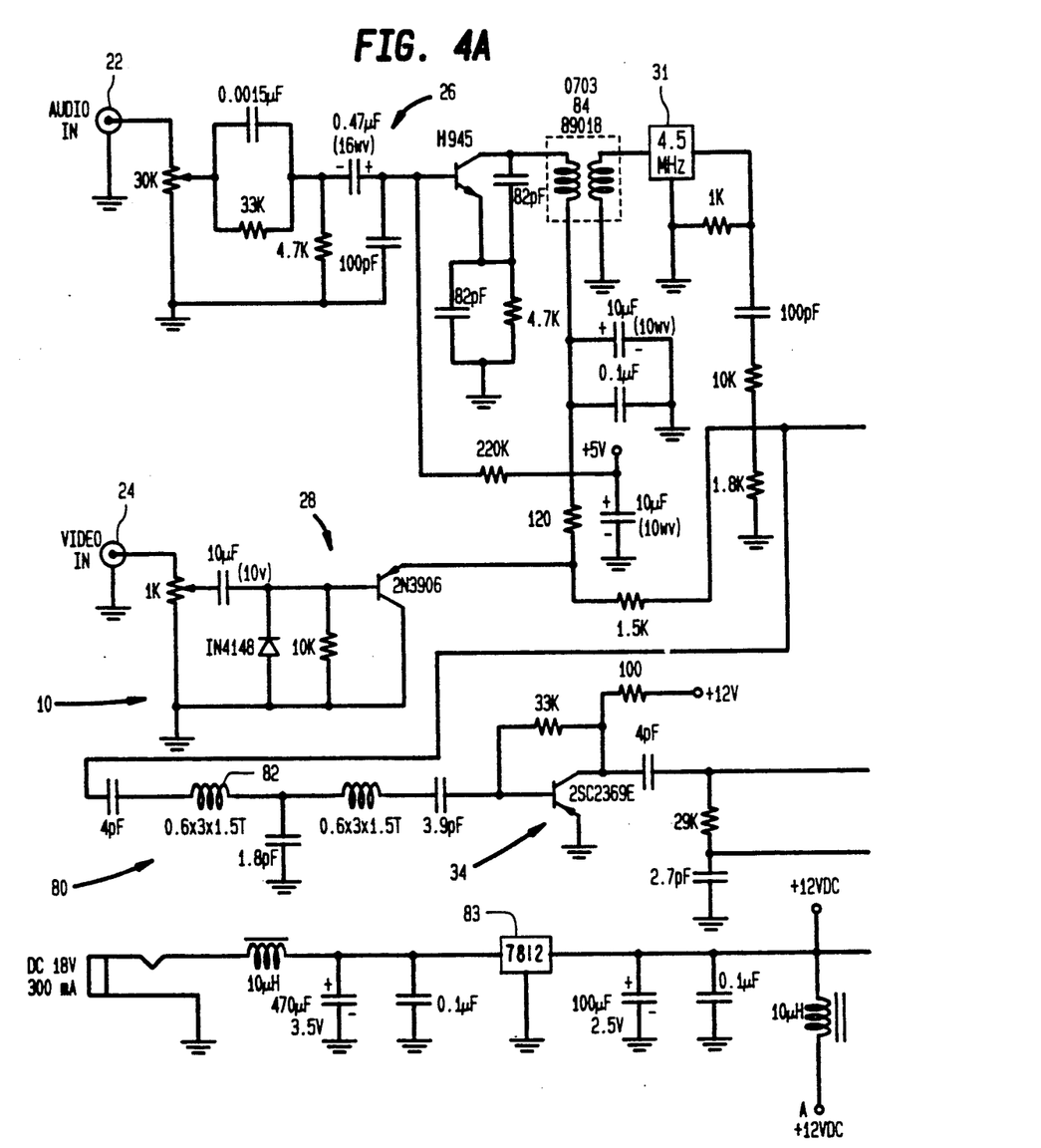
Figure 4B:
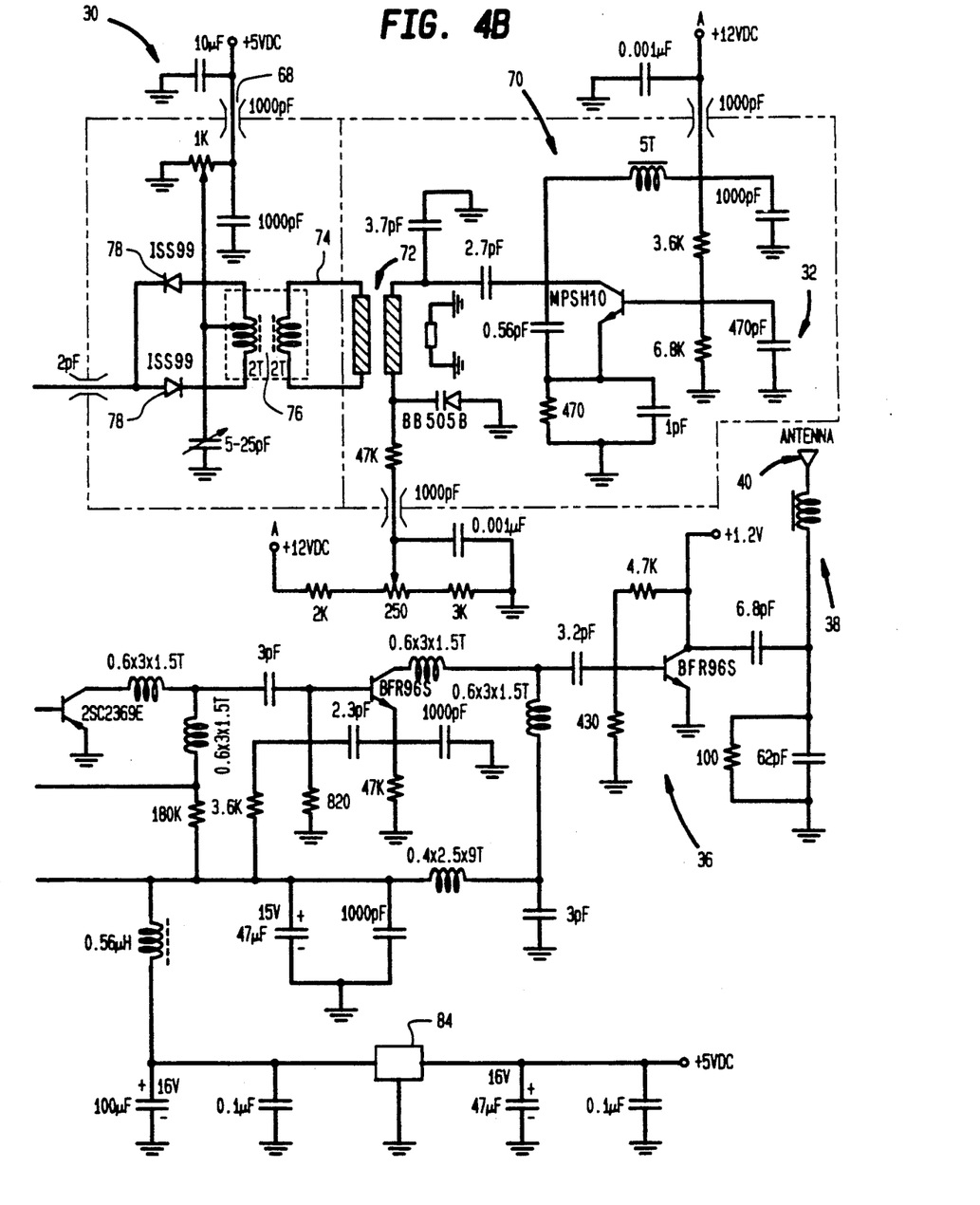
Figures 5, 5A:
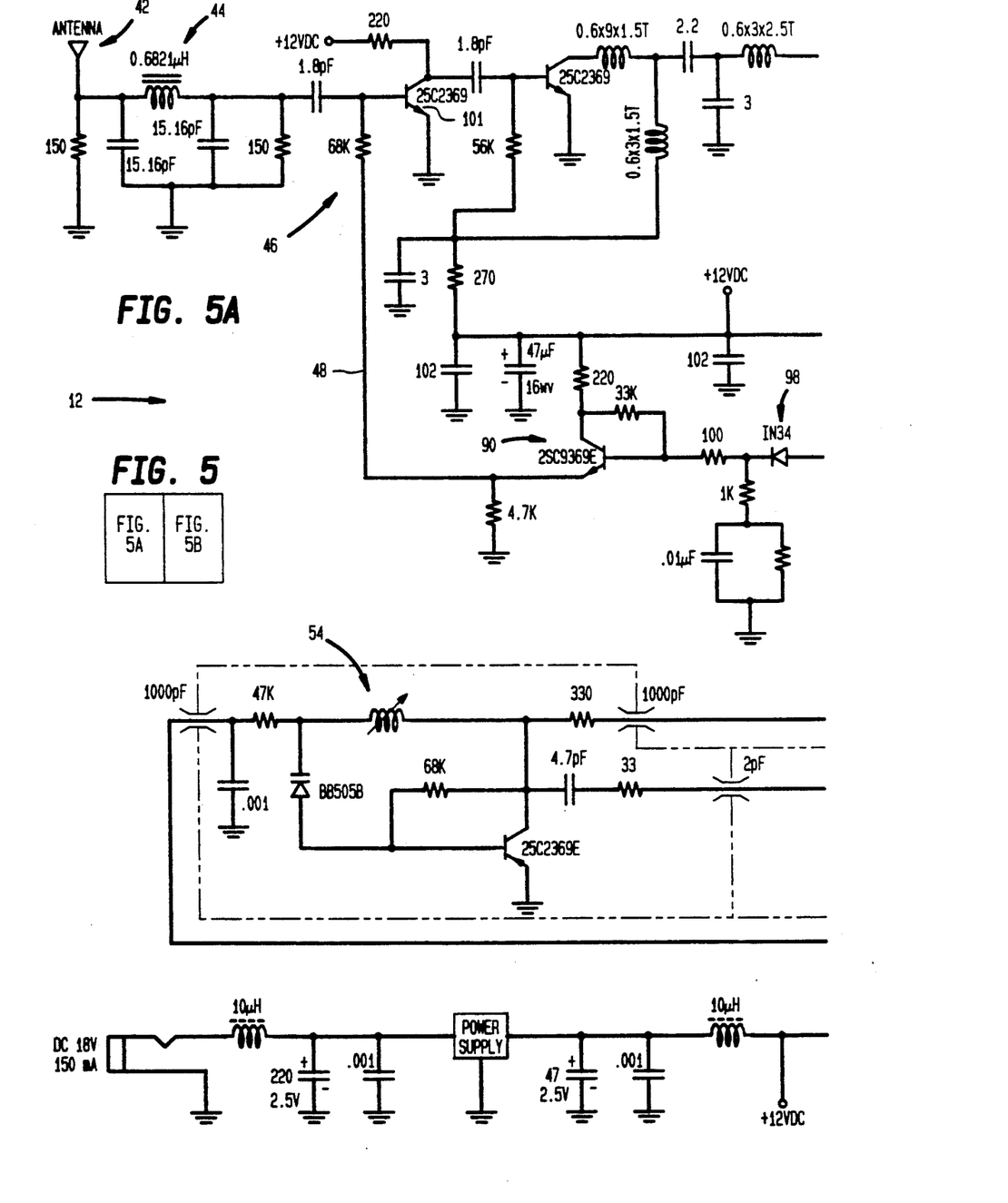
FIGS. 5, 5A and 5B are further schematic diagrams depicting the components illustrated in FIG. 3.
Figure 5B:
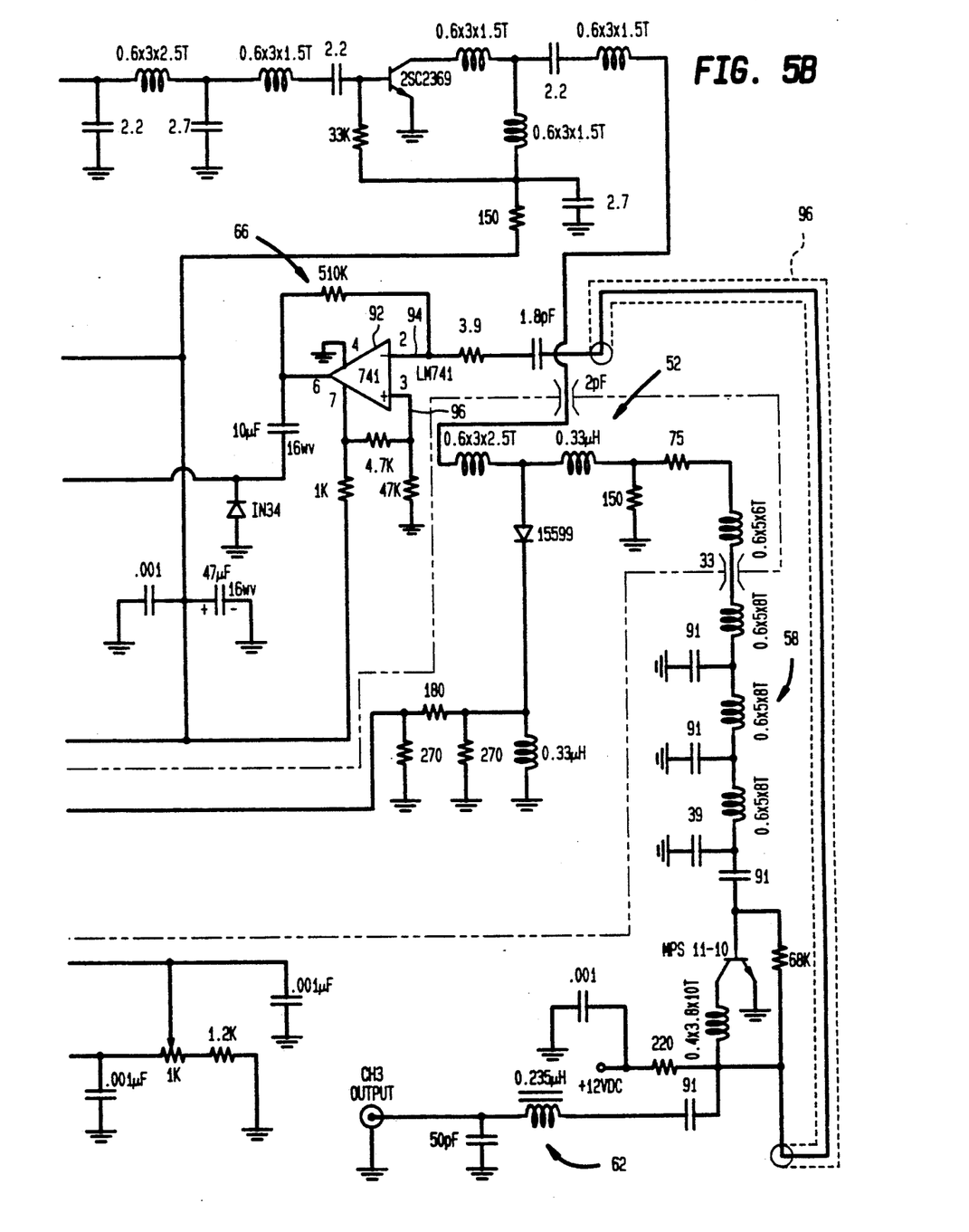

Each of the components constituting transmitter unit 10 and constituting converter unit 12 may be of conventional construction known to those skilled in the art. Also, each of transmitter unit and converter unit 12 may incorporate additional conventional components such as power supplies, shielding, input isolation and overload protective devices and the like. A particularly preferred arrangement for the components of transmitter unit 10 and converter unit 12 is shown is FIGS. 4 and 5. The various portions of the circuits in FIGS. 4 and 5 are designated by the same reference numerals as utilized for the corresponding circuit portions in the block diagrams of FIGS. 2 and 3. The broken lines in FIGS. 4 and 5 each indicate a conductive shield. Connections passing through these shields are arranged with predetermined capacitance to the shields, commonly referred to as feed-through capacitors and shown by symbols as indicated at 68 in FIG. 4. Various inductors are depicted with values stated as three figures multiplied together such as the value "0.6×3×1½ T" appearing at inductor 82. These values should be understood as referring to the diameter of the wire the core diameter and the number of turns. The oscillator 32 as indicated in FIG. 4 includes a drive section 70 inductively linked through a pair of copper bars 72 to a current loop 74, which in turn is connected to a transformer 76 consisting part of the RF modulator 30 discussed above with reference to FIG. 2. The output of audio amplifier 26 is connected to the modulator 30 via a so-called TV sound filter 31. Sound filter 31 provides a 4.5 MHz signal which is frequency modulated with the audio signal from amplifier 26. This modulated 4.5 MHz signal carrying the audio information is then used along with the video signal form amplifier 28 to modulate the carrier signal in modulator 30. Also, a further bandpass filter 80 is interposed between the RF modulator and RF amplifier 34. The various components of the transmitter unit 10 are driven by a pair of regulated power supplies 83 and 84 arranged to provide 12 volt and 5 volt outputs respectively. The other components, symbols, and connections are shown by conventional notation in the schematic diagram and accordingly further explanation is believed unnecessary.

In converter unit 12 automatic gain control circuit 66 incorporates an operational amplifier 92 having inverting and noninverting inputs. The inverting input 94 is connected via a coaxial cable 96 to the output of mixed signal amplifier 60, whereas the noninverting input 96 is connected to a reference voltage source. Operational amplifier 92 provides a signal directly related to the difference between these inputs, which signal is rectified by diode 98 and applied to the base of a transistor 90. Thus, the emitter-collector impedance of transistor 90, and hence the bias applied to transistor 101 of RF preamplifier 46, will vary depending upon the signal from operational amplifier 92.

The circuit having the component values depicted in FIGS. 4 and 5 will operate with free space transmission in the 902-928 MHz ISM band, with a carrier frequency of about 908-922 MHz and with about 0.3 watts radiated power from transmitter unit 10.

Figures 6, 6A:
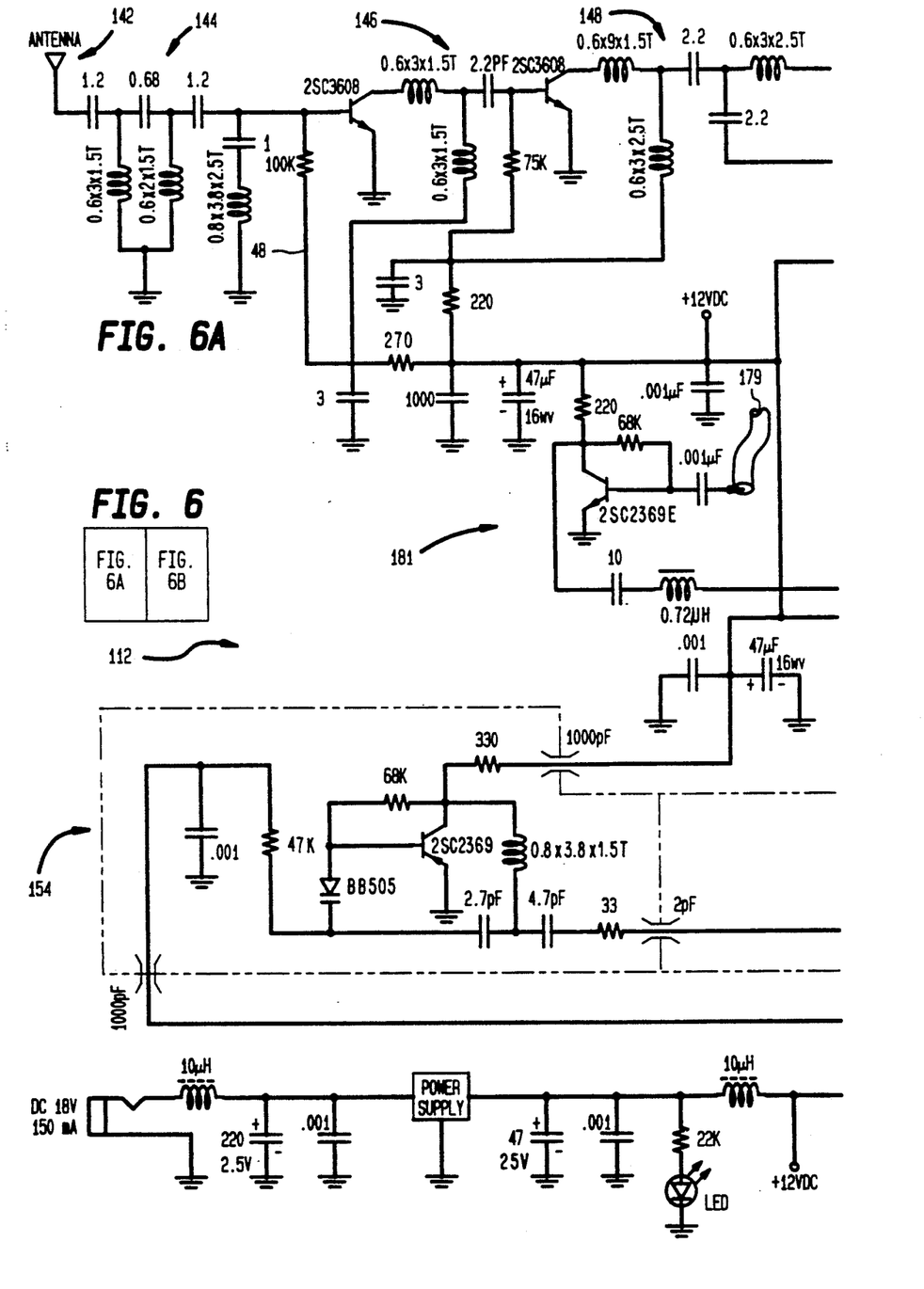
FIGS. 6, 6A and 6B are schematic diagrams similar to FIG. 5 but depicting components according to a further embodiment of the invention.
Figure 6B:
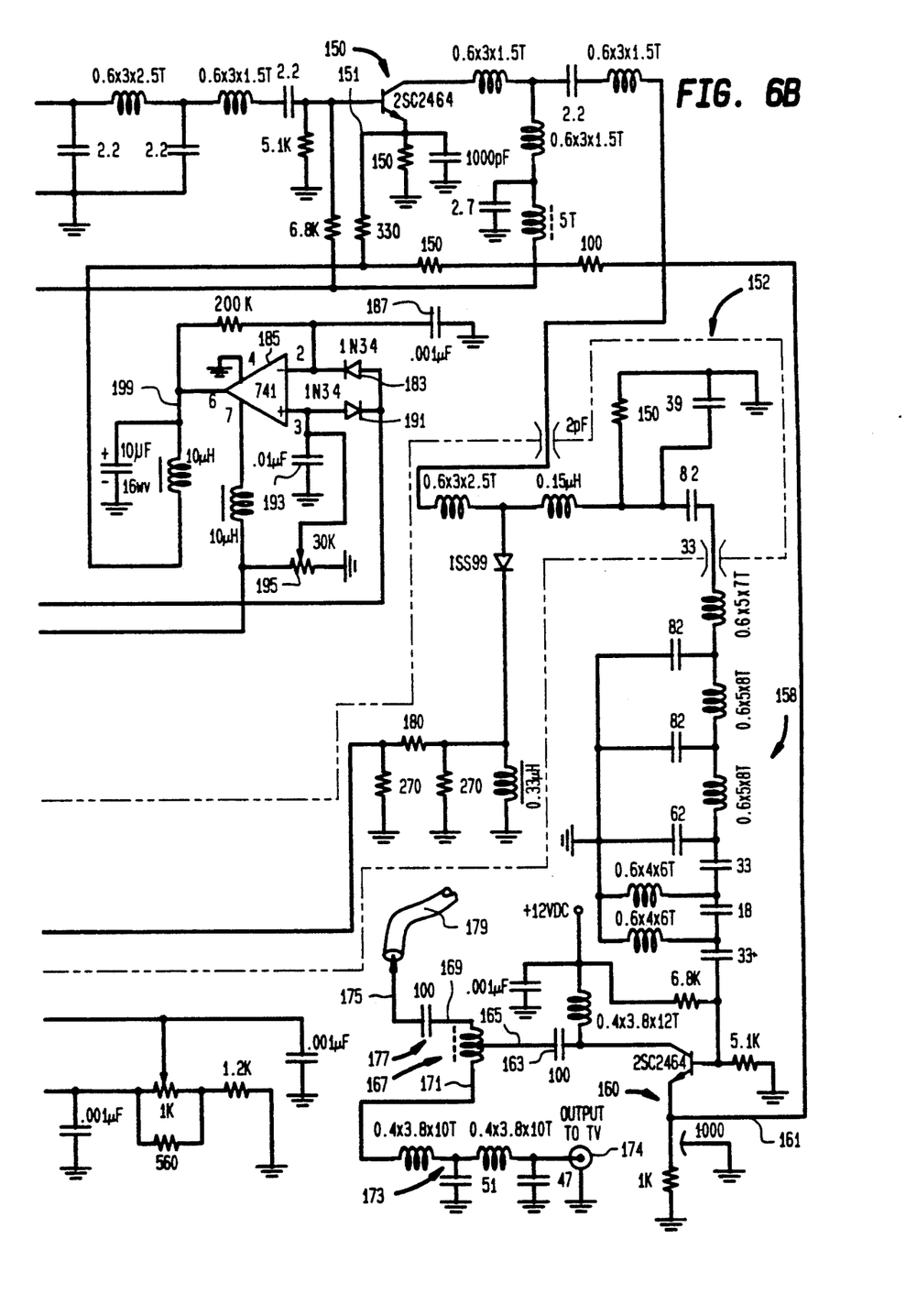

An alternate converter unit 112 according to a further embodiment of the invention is illustrated in FIG. 6. Converter unit 112 is generally similar to converter unit 12 discussed above with reference to FIGS. 3 and 5. The converter unit 112 of FIG. 6 incorporates an antenna 142 and a bandpass filter 144 adapted to pass signals in a relatively narrow band encompassing the 902-930 MHz range and to suppress signal components at frequencies outside this range. The output of this filter is connected to an RF preamplifier 146, and the output of preamplifier 146 is connected to a further RF amplifier 148. RF amplifiers 146 and 148 are fixed gain devices. A third RF amplifier 150 is connected to receive the output from amplifier 148. Amplifier 150 is a variable gain amplifier incorporating a 2SC2464 transistor connected so that the gain of amplifier 150 is regulated by the bias voltage applied to the emitter of this transistor through control input connection 151.

The signal output of amplifier 150 is connected to the signal input of a mixer 152. The other input of mixer 152 is connected to a local oscillator 154. As discussed above, local oscillator 154 provides a signal at a predetermined local oscillator frequency selected such that the difference between the local oscillator frequency and the nonstandard carrier frequency employed by the transmitter 10 (FIG. 1) is equal to a standard television carrier frequency. Mixer 152 also combines the signal from oscillator 154 with the signal from amplifier 150 so as to provide a mixed signal carrying the television information on a standard television carrier frequency.

The output from mixer 152 is connected to the input of a bandpass filter 158 and the output of bandpass filter 158 in turn is connected to the input of a mixed signal amplifier or output amplifier 150. In this case, output amplifier 160 is a variable gain amplifier, again incorporating a transistor such as a 2SC2464 transistor arranged such that the gain of amplifier 160 is controlled by the emitter bias applied to the transistor and, hence, controlled by the voltage applied to control input 161.

The output from amplifier 160 is connected via a capacitor 163 to a center tap 165 of a splitter autotransformer 167. Autotransformer 167 is a three-tap inductor having a winding with end taps 169 and 171 connected to electrically-opposite ends o the winding and center tap 165 connected midway between these end taps. Autotransformer 167 desirably is similar in configuration to the so-called splitter transformers used in systems for splitting signals from television antennas to provide separate signals to separate receivers. Splitter autotransformer 167 may have a toroidal core of approximately 0.013 inch inside diameter, 0.043 inch outside diameter and 0.226 inch length parallel to the axis of the toroidal core. The core may be formed of EMI/RFI Suppressor Core Material No. 43 sold by the Fair-Rite Company of Wallkill, N.Y. Autotransformer 167 may incorporate 2 turns of 30 AWG wire wound on this core, so that center tap 165 is connected to each of the end taps 169 and 171 by a single turn. As will be appreciated, splitter autotransformer 167 defines a first inductance between center tap 165 and end tap 171 and a second inductance between center tap 165 and opposite end tap 169. The output of amplifier 160 is thus connected through the first inductance (through center tap 165 and end tap 171) to the input of a bandpass output filter 173 arranged to pass signals in the range of standard television carrier frequencies. The output of bandpass filter 173 is connected to an output terminal 174. In use, this output terminal 174 is connected to the antenna input terminal (not shown) of a standard television set or other television receiver. The output of amplifier 160 is also connected via the second inductance of splitter autotransformer 167 (via center tap 165 and end tap 169) to the control input 175 of an automatic gain control circuit discussed below. A DC blocking capacitor 177 is interposed between the end tap 169 of the splitter coil and the control input 175.

The automatic gain control circuit includes an amplifier 181 having an input connected via a coaxial cable 179 (partially omitted in FIG. 6 for clarity of illustration) to control input 175. The output of amplifier 181 is connected via a rectifier 183 to the inverting input terminal of an operational amplifier 185. A storage capacitor 187 is connected between the inverting input and ground. The noninverting input of operational amplifier 185 is connected via an oppositely directed rectifier 191 to the output of amplifier 181. The noninverting input of amplifier 185 is also connected to a storage capacitor 193 and connected, via a potentiometer 195 to source of 12 volt DC supply voltage. The output from amplifier 181 imposes a control voltage at the inverting input whereas the supply voltage applied through potentiometer 195 imposes an adjustable reference voltage. The magnitude of this control voltage, and, hence, the magnitude of the difference between voltages applied to the inverting and noninverting inputs of the operational amplifier 185 is directly related to the A amplitude of the output signal applied at the control input 175 of the automatic gain control circuit.

Thus, the output voltage from operational amplifier 185 is directly related to the amplitude of the mixed signal from mixer 158 as amplified by output amplifier 160. The output voltage from operational amplifier 185 is provided at signal output 199. Output 199 is connected to the control inputs 151 and 161 of variable gain amplification stages 150 and 160. The system is arranged so that as the amplitude of the output signal appearing at control input 175 rises, the gains of amplifiers 150 and 160 fall, thus maintaining the output signal level at a substantially predetermined value, within a relatively narrow range.

In the arrangement of FIG. 6, the automatic gain control circuitry is arranged to adjust the gains of the last RF amplification stage and of the output amplifier, rather than to adjust the first RF amplification stage as in the embodiment of FIG. 5. Adjustment of the later RF stage is preferred inasmuch as it has less of a tendency to cause unwanted fluctuations in the RF amplification level The control input 175 of the automatic gain control circuit is effectively isolated from output terminal 174 so that externally-applied signals appearing at output terminal 174 are effectively blocked from propagating to the control input 175. Splitter autotransformer 167 provides substantial isolation of end terminals 169 and 171 from one another, and effectively blocks signal transmission from end terminal 171 to end terminal 169, at least with respect to signals in the range of standard television carrier frequencies. End terminals 169 and 171 are connected to one another only by two inductors in series, viz, the two portions of splitter autotransformer 167, providing a first inductance between center terminal 165 and end terminal 171 and the second portion providing a second inductor between center terminal 165 and end terminal 169. These two inductances in series may provide, for example, about 20 dB attenuation of 6 MHz signals passing from terminal 171 to terminal 169. By contrast, the individual inductors provide relatively low impedance and only about 1 dB attenuation of signals passing from center terminal 165 to either or both of the end terminals.

Autotransformer 167 and DC blocking capacitor 177 thus substantially attenuate any external signals applied to output terminal 174 and block these signals from passage to control input 175 of the automatic gain control circuit. This is particularly important because typical television receivers tend to radiate signals through their antenna terminals. Thus, when the output of the system is connected to the antenna terminal of such a television receiver, these signals will be fed back into the output of the system. Absent the isolation afforded by splitter autotransformer 167, these signals could propagate into the control input of the automatic gain control circuit. The automatic gain control circuit cannot effectively differentiate between such spurious, externally-applied signals, and the output signal from amplifier signal 160. These spurious, externally-applied signals therefore could mislead the automatic gain control circuit and cause the amplitude of the output signal to vary undesirably.

The splitter autotransformer provides a particularly inexpensive and effective isolation device. As will be appreciated, other means for providing isolation between the output terminal 174 and the control input 175 could be provided. For example, an isolation amplifier could be interposed between the output of amplifier 160 and terminal 174, in which case, control input 175 could be connected to the input of such isolation amplifier. Alternatively, the output amplifier 160 itself could serve as such an isolation amplifier, if the control input 175 were connected to the input of amplifier 160 rather than to its output. Such an arrangement, however, might require a further amplification stage between the input of amplifier 160 (the output of mixer 158) and the control input 175 of the automatic gain control circuit and/or might require additional amplification in amplifier 181 of the automatic gain control circuit. As yet another alternative, the output of amplifier 160 could be coupled to output terminal 174 through a photo-optical isolator arranged to transmit signals from the output of the amplifier to the terminal 174 but to block signals passing in the opposite direction. All of these arrangements, however, typically impose cost and/or performance penalties not associated with the simple splitter autotransformer 167 used in the embodiment of FIG. 6.

Numerous various and combinations of the features described above can be utilized without departing from the present invention as defined by the claims. For example, the system can operate with other nonstandard carrier frequencies. As an alternative, the system can employ other means of rendering the broadcast signal from the transmitter unit unintelligible to a standard television receiver. Thus various encoding schemes can be incorporated in the transmitter unit and the corresponding decoding schemes may be incorporated in the converter unit. However, these arrangements are distinctly more complex and hence distinctly less preferred than the simple application of a nonstandard carrier frequency as utilized in the embodiments discussed above. Where the standard television receiver at the remote location incorporates inputs for baseband television signals, such as separate audio and video signals, the converter unit may be arranged to recover the television signal from the nonstandard broadcast signal as baseband audio and video signals rather than as signals modulated on a standard carrier frequency. However, these arrangements would acquire additional complexity in the converter unit and hence are less preferred. Also, the transmitter unit may be arranged to accept television signals in the form of standard broadcast television signals rather than as baseband information. As a further alternative, the converter may be incorporated in a television receiver so as to provide a receiver capable of receiving the standard television signals normally broadcast or the nonstandard signals sent by the transmitter unit according to the present invention. Also, the system according to the invention may be employed with substantially any source of television signals.

As these and other variations and combinations of the features discussed above, the foregoing description of the preferred embodiment should be taken as illustrating rather than as limiting the invention as defined by the claims.

I claim:

1. A converter for receiving a nonstandard broadcast signal on a nonstandard frequency and recovering a television signal therefrom in a form intelligible to a standard television receiver, said converter including RF amplification means for receiving and amplifying a nonstandard broadcast signal frequency having a nonstandard carrier to provide an amplified RF signal, local oscillator means for providing a local oscillator signal at a local oscillator frequency such that the difference between said local oscillator frequency and a nonstandard carrier frequency corresponds to a standard television carrier frequency and means for mixing said local oscillator signal with said amplifier RF signal to thereby provide a mixed signal incorporating said television signal modulated on a standard television carrier frequency, said converter further including automatic gain control means for monitoring the amplitude of said mixed signal and adjusting the gain of said RF amplification means so as to maintain the amplitude of said mixed signal substantially at a predetermined value, output amplifier means for amplifying said mixed signal to provide an output signal, an output terminal connected to said output amplifier means for conducting said output signal to a television receiver, and isolation means for substantially isolating said automatic gain control means from externally applied signals at said output terminal.

2. A converter as claimed in claim 1 wherein said automatic gain control means includes output monitoring means for monitoring the amplitude of said output signal.

3. A converter as claimed in claim 1 wherein said output isolation means includes first and second inductors connected in series between said output terminal and said automatic gain control means, said output amplifier means being connected to said output terminal via said first inductor and to said output monitoring means via said second inductor.

4. A converter as claimed in claim 3 wherein said first and second inductors are formed as a unitary splitter coil having a center tap and a pair of end taps.

5. Apparatus as claimed in claim 1 further including a band pass filter connected between said output amplifier means and said output terminal.

6. A converter as claimed in claim 1, in combination with a transmitter for accepting a television signal, generating a carrier signal of nonstandard carrier frequency, and modulating said carrier signal with said television signal so as to provide said nonstandard broadcast signal and radiating said nonstandard broadcast signal in free space.

7. A method of receiving a nonstandard broadcast signal on a nonstandard carrier frequency and recovering a television signal therefrom in a form intelligible to a standard television receiver, said method including the steps of amplifying said received nonstandard broadcast signal to provide an amplified RF signal, providing a local oscillator signal at a local oscillator frequency such that the difference between said local oscillator frequency and said nonstandard carrier frequency corresponds to a standard television carrier frequency and mixing said local oscillator signal with said amplified RF signal to thereby provide a mixed signal incorporating said television signal modulated on a standard television carrier frequency, amplifying said mixed signal to provide an output signal, delivering said output signal through an output terminal and monitoring the amplitude of said output signal, adjusting the gain applied in said step of applying said receiving nonstandard broadcast signal so as to control the amplitude of said output signal substantially at a predetermined value and substantially attenuating external signals applied to said output terminal so as to exclude said external signals from said step of monitoring the output signal.

* * * * *

UNITED STATES PATENT AND TRADEMARK OFFICE
CERTIFICATE OF CORRECTION

PATENT NO. : 5,198,903

DATED : March 30, 1993

INVENTOR(S) : Tinaphong

It is certified that error appears in the above-identified patent and that said Letters Patent is hereby corrected as shown below:

Column 9, line 18, "o" should read --of--.
Column 10, line 2, "A" should read --AC--.
Column 10, line 24, after "level" insert a period.
Column 11, line 63, after nonstandard and before frequency insert --carrier--.
Column 12, line 61, change "receiving" to --received--.

Signed and Sealed this

Eleventh Day of January, 1994

Attest:

BRUCE LEHMAN

*Attesting Officer*      *Commissioner of Patents and Trademarks*